United States Patent
Maguire et al.

[11] Patent Number: 6,089,821
[45] Date of Patent: Jul. 18, 2000

[54] GAS TURBINE ENGINE COOLING APPARATUS

[75] Inventors: Alan R Maguire, Derby; Martyn Richards, Burton on Trent, both of United Kingdom

[73] Assignee: Rolls-Royce plc, London, United Kingdom

[21] Appl. No.: 09/072,043

[22] Filed: May 5, 1998

[30] Foreign Application Priority Data

May 7, 1997 [GB] United Kingdom ............... 9709086

[51] Int. Cl.[7] .................................................. F01D 11/08
[52] U.S. Cl. ..................... 415/115; 415/116; 415/175; 415/178
[58] Field of Search .................... 415/115, 116, 415/173.1, 173.2, 173.3, 173.4, 173.5, 173.6, 175, 176, 177, 178

[56] References Cited

U.S. PATENT DOCUMENTS

| | | |
|---|---|---|
| 3,632,223 | 1/1972 | Hampton . |
| 3,742,705 | 7/1973 | Sifford ......................... 415/117 |
| 4,087,199 | 5/1978 | Hemsworth et al. .............. 415/174 |
| 4,177,004 | 12/1979 | Riedmiller et al. .............. 415/116 |
| 4,213,296 | 7/1980 | Schwarz ....................... 415/116 |
| 4,230,436 | 10/1980 | Davison ....................... 415/1 |
| 4,242,042 | 12/1980 | Schwarz ....................... 415/116 |
| 4,485,620 | 12/1984 | Koenig et al. .................. 415/116 |
| 4,596,116 | 6/1986 | Mandet et al. .................. 60/39.07 |
| 4,642,024 | 2/1987 | Weidner ....................... 415/116 |
| 4,841,726 | 6/1989 | Burkhardt ..................... 415/116 |
| 5,048,288 | 9/1991 | Bessette et al. ................ 60/226.1 |
| 5,169,287 | 12/1992 | Proctor et al. ................. 415/115 |
| 5,472,315 | 12/1995 | Alexander et al. .............. 415/173.4 |
| 5,593,278 | 1/1997 | Jourdain et al. ................ 415/173.2 |
| 5,927,942 | 7/1999 | Stahl et al. ................... 415/115 |

FOREIGN PATENT DOCUMENTS

| | | |
|---|---|---|
| 77625 | 4/1983 | European Pat. Off. . |
| 102308 | 5/1987 | European Pat. Off. . |
| 2534982 | 10/1982 | France . |
| 2104966 | 3/1983 | United Kingdom . |
| 2108586 | 5/1983 | United Kingdom . |
| 2085083 | 9/1984 | United Kingdom . |
| 2136508 | 12/1987 | United Kingdom . |
| 2245314 | 1/1992 | United Kingdom . |
| 2251040 | 6/1992 | United Kingdom . |
| 2267129 | 11/1993 | United Kingdom . |

*Primary Examiner*—Edward K. Look
*Assistant Examiner*—Richard Woo
*Attorney, Agent, or Firm*—W. Warren Taltavull; Farkas & Manelli PLLC

[57] ABSTRACT

A gas turbine engine has an assembly of circumferentially spaced rotor blades each having a radial tip. A plurality of seal segments mounted for radial movement circumscribe the rotor blades. Each segment is connected to the casing through a seal carrier provided with a flexible membrane which divides high pressure air from low pressure into two channels.

11 Claims, 2 Drawing Sheets

GAS TURBINE ENGINE COOLING APPARATUS

FIELD OF THE INVENTION

This invention relates to cooling apparatus for use with a gas turbine engine. More particularly but not exclusively this invention relates to a clearance control apparatus for a gas turbine engine which controls the clearance between the casing of the engine and the tips of the turbine blades.

BACKGROUND OF THE INVENTION

It is important to ensure the clearance between the tips of each rotating turbine blade and the casing is kept to a minimum. The most efficient arrangement would have no clearance gap between the turbine blades and the casing or seal within the casing. In use, the turbine blades experience thermal expansion due to the working gases and also expand due to the rotational forces of the blades. The annular casing however is stationary and only expands due to being heated by the working gases.

Thus it is essential that there is a clearance gap between the blade and the casing to accommodate such expansion. However this gap is necessarily controlled so as to provide a minimum clearance at normal cruise conditions, whilst also ensuring that the blade tips do not rub on the shroud during transient operating conditions.

In gas turbine engines it is useful to utilise the high pressure air from the compressors to cool turbine discs and turbine blades. It is an important design consideration that the cooling air flow from the compressors is utilised to best effect. For example high pressure air from the high pressure compressor may be used to cool the combustion chamber and the high pressure turbine blade through internal cooling passages. Lower pressure air from the compressor region may be used to cool the turbine discs of the lower pressure turbine regions.

SUMMARY OF THE INVENTION

It is an object of the present invention to provide an improved blade tip clearance control apparatus and/or to provide improvements which attempt to alleviate the aforementioned problems.

According to the present invention there is provided a gas turbine engine comprising an assembly of circumferentially spaced rotor blades each having a radial tip, a plurality of seal segments circumscribing said rotor blades, each segment mounted for radial movement and connected through attachment means to a casing wherein said attachment means comprises at least two discrete chambers radially separated by a separation element.

Advantageously the provision of separate chambers ensures that, in use, two compressed air supplies do not become mixed and are able to perform their respective cooling functions more efficiently. Also radial movement of the seal and hence tip clearance control is provided efficiently.

BRIEF DESCRIPTION OF THE DRAWINGS

The present invention will now be described with reference to the accompanying drawings in which.

DETAILED DESCRIPTION OF THE INVENTION

Figure 1:
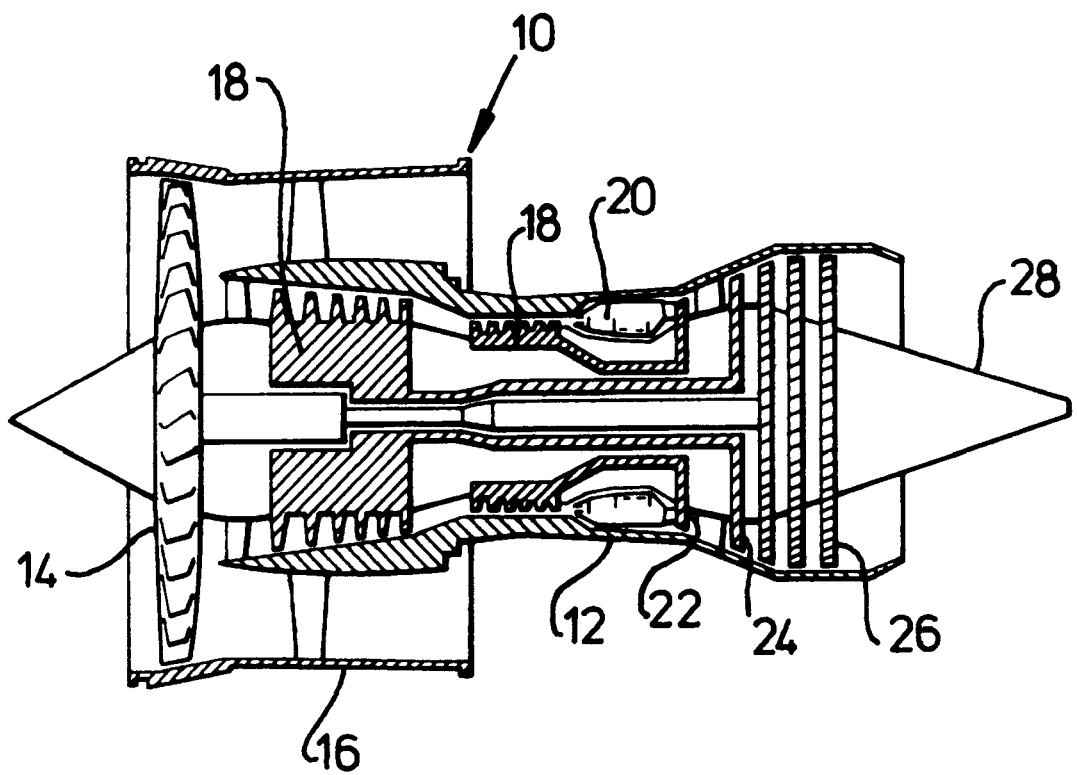
FIG. 1 is a schematic illustration of a gas turbine engine incorporating tip clearance apparatus in accordance with the present invention.

With reference to FIG. 1, a gas turbine engine 10 comprises a core engine contained within a casing 12. A fan 14 is driven by the core engine, the fan being contained within a fan casing 16 attached to the casing 12. The core engine comprises in flow series compressors 18 a combustor 20, high, intermediate and low pressure turbines 22, 24 and 26 respectively. The turbines are connected to the fan 14 and compressors 18 to provide drive. The engine 10 functions in the conventional manner with air being drawn in and compressed by the fan 14 and the compressors 18. The compressed air is mixed with fuel and air in the combustor. The resultant exhaust gases expand through the turbines 22, 24, and 26 and are exhausted through the exhaust nozzle 28.

Propulsive thrust is provided by the exhaust flow through the nozzle 28 and through air from the fan 14 which bypasses the compressors 18.

Figure 2:
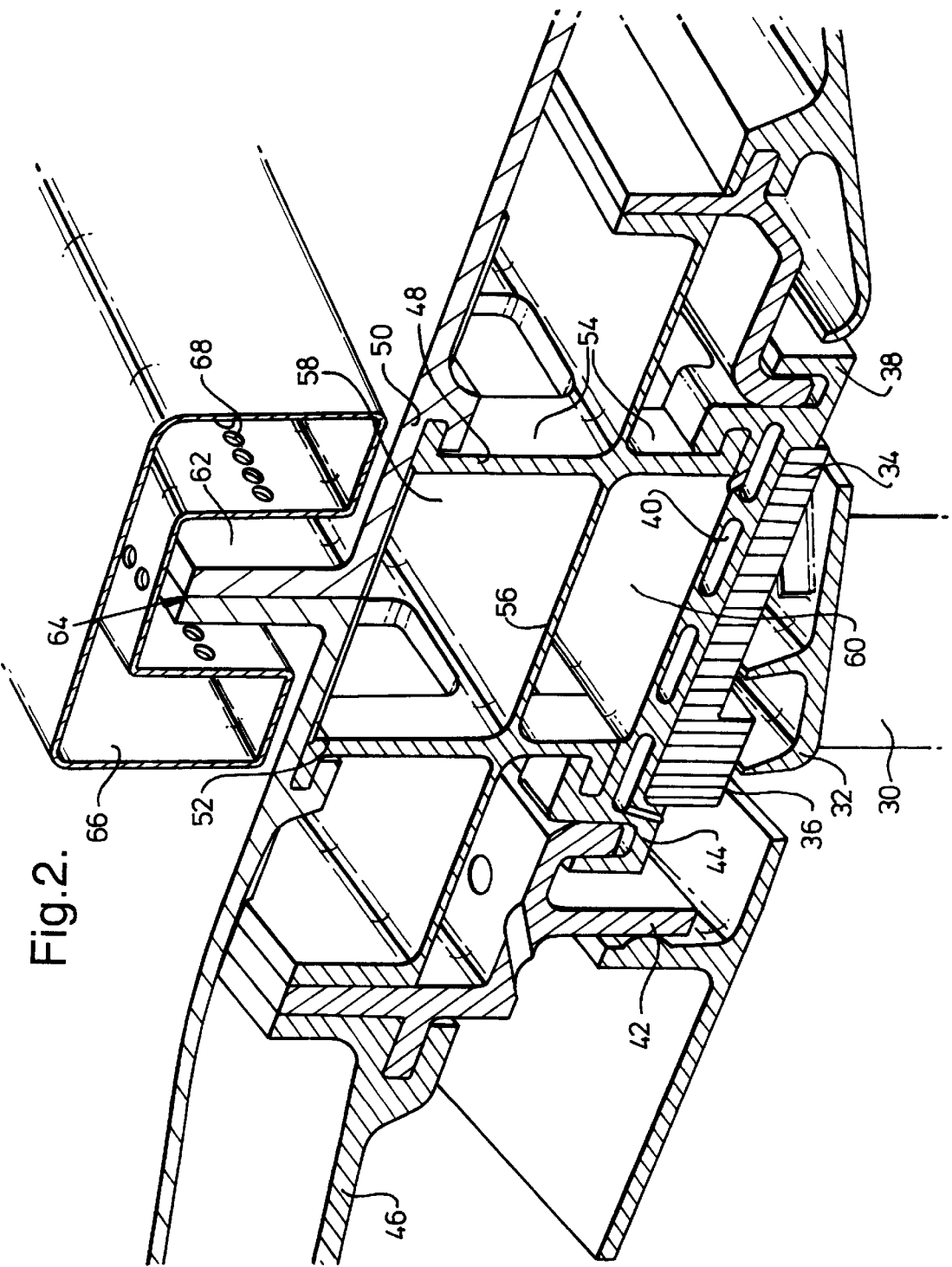
FIG. 2 is a sectional view of the blade tip clearance control apparatus of the engine shown in FIG. 1.

Referring now to FIG. 2 turbine blade 30 forms part of an annular array of rotary aerofoil blades. The turbine blade is hollow to permit the flow of cooling air from the compressor region 18 into the blade. A shroud 32 is mounted on the tip of each blade 30, although it is envisaged that the present invention is equally applicable to shrouded and unshrouded blades. A shroud liner 34 surrounds the blades and comprises a ring type structure. The radially inner surface 36 of the shroud liner segments is provided with a ceramic coating to reduce the cooling heat flux required to maintain the shroud liner segments 34 at a suitable temperature.

A plurality seal segments 38 are attached to each shroud liner 34. The seal segment comprises a number of channels 40. High pressure flow from the high pressure compressor 18 is directed through channels 40 to provide cooling to the seal segment 38. Each seal segment 38 is connected to a mounting element 42 through a U shaped slot 44. This mounting element is itself connected to the inner turbine casing 46.

Seal segment 38 is also mounted on a seal carrier 48 which is itself mounted on the outer turbine casing 50. The outer turbine casing 50 is provided with an insulation coating 52 preferably comprising a ceramic coating, which helps to reduce heat input into the outer casing 50. The seal carrier 48 is located between the seal segment 34 and the outer casing 50 via castellated support legs 54. Advantageously these attachment features 54 provide a radial connection link without undesirable mechanical 'hoop' stiffness. The seal carrier 48 is provided with a flexible membrane or diaphragm 56, the main function of which is to divide the low pressure air from the low or intermediate pressure compressor into the channel 58, radially outward of the membrane 56, and high pressure air from the high pressure compressor which flows into the channel 60, radially adjacent the seal segment 38. 'Expensive' high pressure air from the high pressure compressor can therefore be usefully directed underneath membrane 56 and cool seal segment 34 through channels 40. Due to the provision of flexible membrane 56 it is not contaminated with lower pressure air flowing above the membrane to cool other parts of the engine structure. Also advantageously if a stream of hot combustion gases should escape from the combustor itself, this flame stream would be more likely to remain contained above the membrane 56 since this is at a lower pressure than that below the membrane 56.

The outer turbine casing 50 also comprises a of pair radially extending flanges 62 positioned centrally above the seal carrier 48. The radially extending flange of each pair abut each other so as to, in effect, form a ring structure or rail assembly 64 circumventing the rotor blades. This control ring 64 is positioned within a hollow U shaped manifold 66. This manifold is provided with a number of apertures 68 formed within the inner faces of the manifold.

In use, cooling air ducted from the fan 14 is directed into the hollow manifold 66 and exits via apertures 68 so as to provide a cooling effect onto the control ring 64 and adjacent casing surfaces. The control of this cooling air is provided an on/off valve operated via an electronic control system based on altitude and high pressure shaft speed. This ring then contracts which has the effect of moving the seal segment 34 closer to its associated blade tip via seal carrier 48. The coating 52 also helps to prevent heat input into the control ring 64 during cruise conditions which could counter the effect of cooling air flow from manifold 66.

Movement of the seal segment 34 closer to the blade tip during certain engine conditions has the effect of minimising the tip clearance leakage through this gap, thus increasing efficiency.

We claim:

1. A gas turbine engine comprising a casing, an annular array of circumferentially spaced rotor blades each blade having a radial tip, a plurality of seal segments circumscribing said rotor blades, attachment means connecting and mounting each segment to the casing, the attachment means arranged for radial movement of the seal segments, wherein said attachment means and a separation element define at least two discrete, fluid isolated and radially separated chambers.

2. A gas turbine engine according to claim 1 wherein said said discrete chambers are separated by a diaphragm.

3. A gas turbine engine according to claim 2 wherein said diaphragm comprises a flexible material.

4. A gas turbine engine according to claim 1 wherein a rail assembly is provided on the casing.

5. A gas turbine engine according to claim 4 wherein said rail assembly comprises a ring structure circumscribing said casing.

6. A gas turbine engine according to claim 4 wherein at least one manifold is positioned around said rail assembly.

7. A gas turbine engine according to claim 4 wherein insulating material is provided on a radially inner surface of said rail assembly.

8. A gas turbine engine according to claim 1 wherein said attachment means comprises castellated leg portions.

9. The invention as claimed in claim 1 wherein a radially outer one of said chambers receives air at a selected pressure from a source while the radially inner one of said chambers receives cooling air from a separate source.

10. The invention as claimed in claim 10 wherein the cooling air supplied to the radially inner one of said chambers is at a pressure that is higher than said selected pressure.

11. A gas turbine engine comprising a casing, an annular array of the circumferentially spaced rotor blades, each blade having a radial tip, a plurality of seal segments circumscribing said rotor blades, attachment means connecting and mounting each segment to the casing, the attachment means being arranged for radial movement of the seal segments, wherein said attachment means and a separation element define at least two discrete, radially separated chambers, a rail assembly being provided on the casing, said rail assembly comprising a ring structure circumscribing said casing, at least one manifold being positioned around said rail assembly, means being provided to direct cooling air to said manifold and said manifold being provided with apertures for directing said cooling air onto said rail assembly to provide impingement cooling of said rail assembly.

* * * * *